Feb. 2, 1943. H. M. FITCH ET AL 2,309,838
SELF-CLEANING AUTOMOTIVE AIR CLEANER
Filed Nov. 25, 1940 2 Sheets-Sheet 1

HOWARD M. FITCH
WILLIAM K. GREGORY
INVENTORS

BY Arthur J Robert
ATTORNEY.

Feb. 2, 1943. H. M. FITCH ET AL 2,309,838
SELF-CLEANING AUTOMOTIVE AIR CLEANER
Filed Nov. 25, 1940   2 Sheets-Sheet 2

HOWARD M. FITCH
WILLIAM K. GREGORY
INVENTORS

BY Arthur H Robert
ATTORNEY.

Patented Feb. 2, 1943

2,309,838

UNITED STATES PATENT OFFICE 2,309,838

SELF-CLEANING AUTOMOTIVE AIR CLEANER

Howard M. Fitch and William K. Gregory, Louisville, Ky., assignors to American Air Filter Company, Inc., Louisville, Ky., a corporation of Delaware Application November 25, 1940, Serial No. 367,018

5 Claims. (Cl. 183—8)

The automotive self-cleaning air cleaners disclosed in the Nutting and Fitch patents, respectively numbered 2,238,280 and 2,230,453, comprise: a bottom reservoir; a top air-filter medium; and an interposed precleaner in the form of a double vortex cyclone. In both cleaners, incoming air is mixed with oil from the reservoir, precleaned by the cyclone to remove most of the oil and dust, which is returned to the reservoir, and filtered by the filter medium to remove the last traces of oil and dust which drains gravitationally from the medium, thus keeping it coated and clean. In the Nutting cleaner, the incoming air aspirates oil from the reservoir and then passes directly into the cyclone, while, in the Fitch cleaner, it impinges against the reservoir oil and then travels to the cyclone through a mixing passage.

These cleaners are particularly satisfactory because they maintain an unusually heavy flow of oil into the precleaner, which is necessary to insure the preliminary removal of the bulk of the dust contained in the air, and a light flow of oil into the filter medium, which is adequate to keep it coated and clean. They have the disadvantage, however, of interposing, to the flow of air, a resistance of sufficient magnitude to preclude their application to many uses.

The principal object of this invention is to lessen the resistance of this general type of cleaner without sacrificing oil flow and other desirable characteristics.

Figure 1:
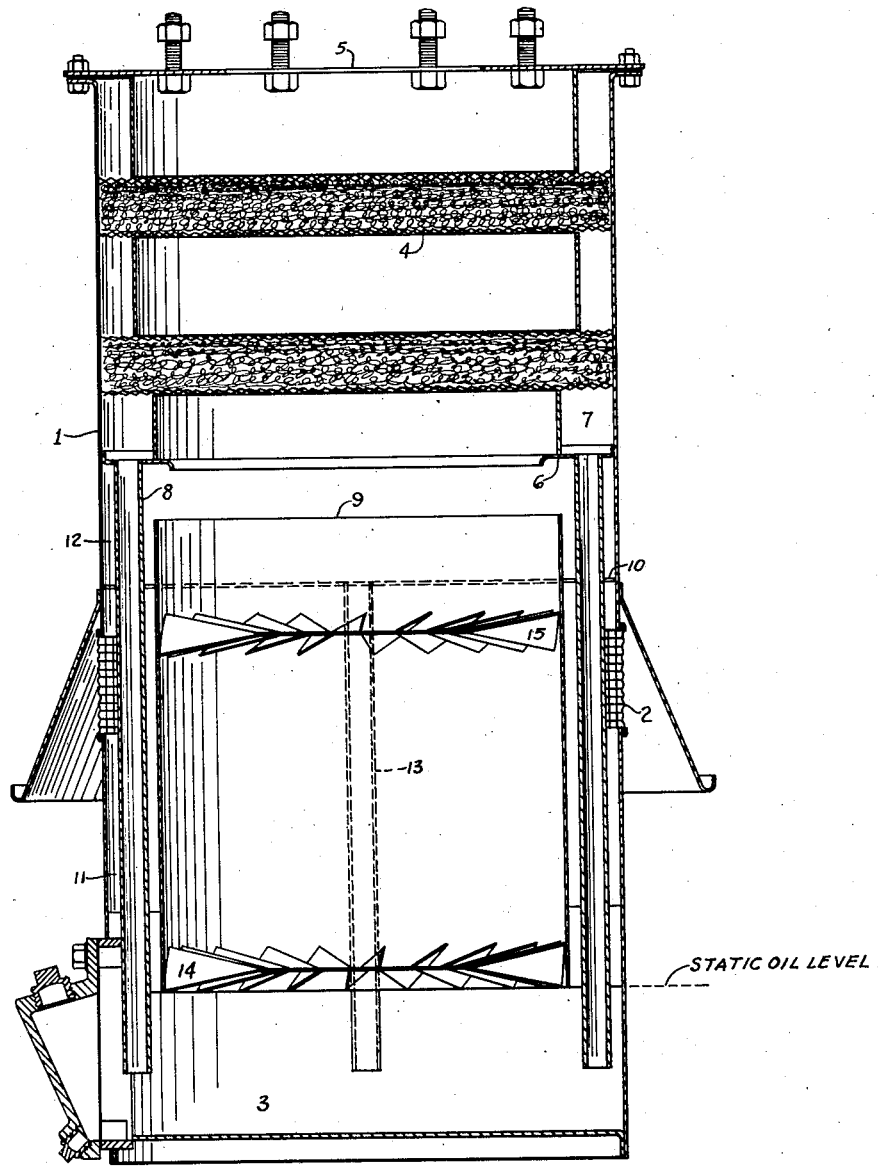
Figure 2:
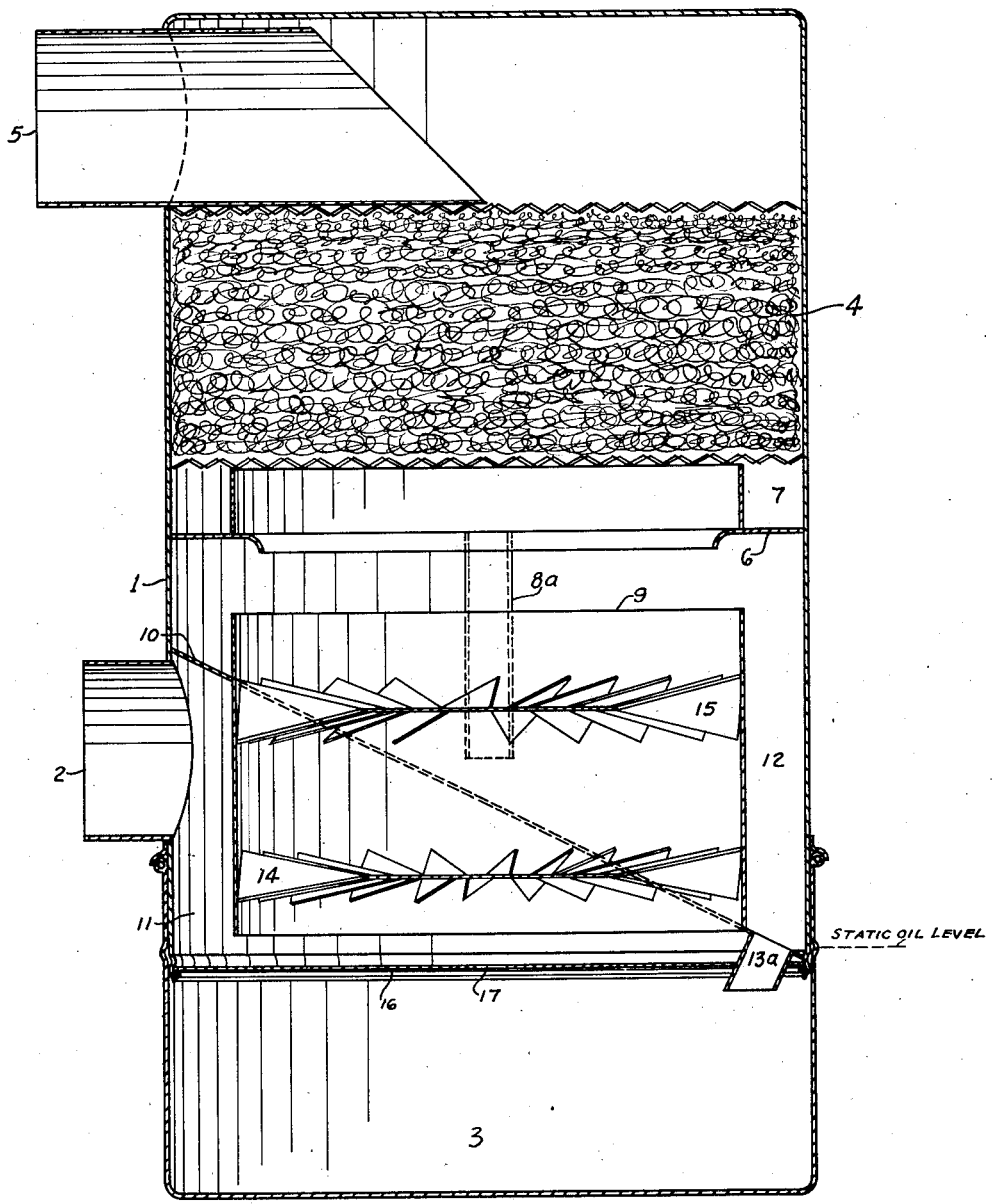

The invention is illustrated in the accompanying drawings wherein:

Figure 1 is a vertical sectional view of an air cleaner embodying this invention; and Figure 2 is a similar view of a slightly modified form of cleaner.

The air cleaner illustrated in Figure 1 conventionally includes: a casing 1 having an air inlet 2, a bottom liquid reservoir or oil bath 3, an upper filter medium 4, and upper air outlet 5. The filter medium 4 is conventionally supported within the casing by a partition 6 providing a central opening through which air is discharged upwardly into the filter medium and a surrounding drainage chamber 7 having diametrically opposed conduits 8 connecting it with the bottom reservoir 3.

In the air cleaner, means are provided constraining the incoming air to flow downwardly into sufficiently close contact with the reservoir liquid to insure heavy liquid-entrainment and thence to flow upwardly away from said reservoir into the filter medium. The invention contemplates subjecting the upwardly flowing column of air, between the reservoir and the filter medium, to a novel pre-cleaning action. Accordingly an inner sleeve or shell 9 is vertically arranged within the casing with its lower end adjacent the reservoir 3 to force the incoming air into proper contact with the reservoir liquid and thence to receive and direct the air upwardly away from such liquid. The upper end of the sleeve 9 is spaced below the partition 6 and disposed to discharge the column of air upwardly, through the intermediate space between the sleeve and the partition, into the central opening of the partition. The sleeve is supported in this position by a flat ring baffle 10 which fits closely over the sleeve and against the walls of the casing and is secured to both at a point below the upper end of the sleeve but above the inlet of the casing. The ring baffle 10 thus cooperates with the casing and sleeve to form an inlet compartment 11 which communicates with the lower end of the sleeve. It also cooperates with the casing, sleeve and partition 6 to provide a precleaning chamber 12 extending around the upper end of the sleeve and having open communication with the periphery of the air stream or column passing upwardly through the intermediate space directly between the sleeve and the central opening of partition 6. The precleaning chamber 12 is connected through diametrically opposed conduits 13 to the reservoir 3.

In further accordance with this invention, swirl vanes 14 of one pitch are positioned within the sleeve adjacent its lower end, while swirl vanes 15 of a greater pitch are positioned within the sleeve at a point spaced somewhat below its upper end.

With this arrangement, air enters the inlet 2, passes downwardly through the inlet compartment 11, and then impinges against the surface of the oil as it turns around the lower end of the sleeve to enter and pass upwardly through the sleeve. As it enters the sleeve, the lower vanes 14 impart a whirling action to the dust laden air, and to the oil entrained in it by virtue of its impingement against the bath. As a result, the bulk of entrained oil is centrifuged outwardly against the inner wall of the sleeve forming a heavy film thereon which moves spirally upwardly through the sleeve. The bulk of the dust particles is also centrifuged outwardly against the wall of the sleeve and thus brought into contact with the heavy film, and thereby not only effectively removed from the air stream but transported by the moving film of oil upwardly through the sleeve. When the air and the oil film reach the upper swirl vanes 15, they are caused to whirl at a faster rate. The higher centrifugal forces thus imparted to the oil film and the air lessen the possibility of oil being picked up from the film and carried by the air into the medium, and increase the probability of the oil film being forced to travel around the upper end of the sleeve into the precleaning chamber 12, from which it drains through conduits 13 back to the reservoir 3.

The precleaned air, with the last traces of dust and oil, passes across the space between the sleeve and partition, through the partition opening and into the filter medium which operates to remove dust and liquid and to permit the removed liquid to collect and drain gravitationally from the medium and thereby wash the dust therefrom. This drainage passes into the drainage chamber 7 and through conduits 8 to the reservoir 3.

The Figure 1 cleaner is modified in Figure 2 in order to adapt it for more effective use upon tanks and other vehicles in which the cleaner is very apt to be tilted to very substantial degrees at varying intervals during operation. Accordingly, the oil bath 3 is provided with a plate 16 extending completely across the casing at a point slightly below the static oil level and provided with a small centrally positioned opening 17 through which the upper and lower portions of the bath communicate. This plate restricts the sloshing of the oil when the cleaner is tilted without interfering with its circulation during normal operation. Only one side of the casing is provided with an air inlet 2 in order that the ring baffle 10 may be inclined to slope downwardly from a point above the inlet on the inlet side of the casing to a substantially lower point on the opposite side of the casing. For example, by sloping the ring baffle downwardly to the static oil level, as shown, the precleaning chamber 12 is correspondingly extended downward and thus made to provide a deep pocket in which oil will always collect despite the substantial angles at which the cleaner may be tilted in normal use. In this way, the possibility of oil in the precleaning chamber being sloshed back into the air stream, when the cleaner is tilted, is correspondingly lessened. The drainage chamber 7 drains through conduits 8a into the precleaning chamber, while the lowermost portion of the latter drains into the bath through a conduit 13a which passes through the oil-bath plate 16.

Having described our invention, we claim:

1. An improvement in automotive air cleaners of the self-cleaning type, having a lower reservoir and an upper filter medium, wherein incoming dust-laden air entrains reservoir liquid by impingement before passing to the medium, which operates to remove residue dust and liquid and to permit dust-laden liquid to drain gravitationally therefrom, comprising: means constraining the incoming air to flow downwardly into sufficiently close contact with the reservoir liquid to insure heavy liquid-entrainment and thence to flow upwardly away from said reservoir, said means including a sleeve vertically arranged with its lower end adjacent the reservoir to confine the incoming air as it flows from said reservoir in the form of an upwardly moving column and with its upper end spaced below the medium and disposed to discharge said column directly upward through the intermediate space between the sleeve and the medium into the medium; means providing a separating chamber extending around the upper end portion of the sleeve and having open communication with the outer periphery of the air column passing upwardly through said intermediate space; stationary lower and upper vanes arranged within said sleeve for separately imparting to the dust laden air, passing upwardy through said sleeve, whirling motion of such intensity that the whirling air is operative not only to centrifuge liquid and dust against the inner wall of the sleeve to form a liquid film thereon, but to move the film upwardly along the sleeve and then force it outwardly around the upper end of the sleeve into the separating chamber; and means for draining liquid from the separating chamber.

2. The cleaner defined in claim 1 wherein: said lower swirl vanes are of one pitch; and said upper swirl vanes are of a greater pitch.

3. An improved automotive air cleaner of the self cleaning type comprising: an outer casing containing a lower reservoir, an upper filter medium and an air inlet; means constraining the incoming air to flow downwardly into sufficiently close contact with the reservoir liquid to insure heavy liquid-entrainment and thence to flow upwardly away from said reservoir, said means including a sleeve vertically arranged within the casing with its lower end adjacent the reservoir to confine the incoming air as it flows from said reservoir in the form of an upwardly moving column and with its upper end spaced below the medium and disposed to discharge said column directly upward through the intermediate space between the sleeve and the medium into the medium; means providing a separating chamber extending within said casing around the upper end portion of the sleeve and having open communication with the outer periphery of the air column passing upwardly through said intermediate space; stationary lower and upper vanes arranged within said sleeve for separately imparting to the dust laden air, passing upwardly through said sleeve, whirling motion of such intensity that the whirling air is operative not only to centrifuge liquid and dust against the inner wall of the sleeve to form a liquid film thereon, but to move the film upwardly along the sleeve and then force it outwardly around the upper end of the sleeve into the separating chamber; said filter medium operating to remove the residue dust and liquid remaining in the air column; and means for draining liquid from both the filter medium and the separating chamber.

4. An improved automotive air cleaner of the self cleaning type comprising: an outer casing containing a lower reservoir, an upper filter medium, and an interposed side air inlet; an inner sleeve vertically arranged within the casing between the reservoir and medium with its upper end spaced below the medium, and its side walls spaced inwardly from the side walls of the casing; baffle means dividing the space between sleeve and casing into a lower inlet compartment and an upper separating chamber, the latter extending around the upper portion of the sleeve and having open communication with the outer periphery of the space intermediate the sleeve and the medium; said casing, sleeve and baffle means constraining the air, entering said inlet, to pass downwardly through the inlet compartment around the lower end of the sleeve and thence upwardly as an air column through the sleeve and intermediate space to the filter medium, the lower end of the sleeve being positioned to force the air into sufficiently close contact with the reservoir liquid to insure heavy liquid-entrainment by the air; stationary lower and upper vanes arranged within said sleeve for separately imparting to the column of dust laden air, passing upwardly through said sleeve, whirling motion of such intensity that the whirling air is operative not only to centrifuge liquid and dust against the inner wall of the sleeve to form a liquid film thereon, but to move the film upwardly along the sleeve and then force it outwardly around the upper end of the sleeve into the separating chamber; said filter medium operating to remove the residue dust and liquid remaining in the air column; and means for draining liquid from both the filter medium and the separating chamber.

5. The cleaner defined in claim 4 wherein: said lower swirl vanes are of one pitch; and said upper swirl vanes are of a greater pitch.

HOWARD M. FITCH.
WILLIAM K. GREGORY.